United States Patent
Liu et al.

(10) Patent No.: US 8,922,888 B2
(45) Date of Patent: Dec. 30, 2014

(54) FRONT PROJECTION SCREEN WITH HIGH CONTRAST

(75) Inventors: Yufeng Liu, Woodbury, MN (US); David T. Yust, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 150 days.

(21) Appl. No.: 13/503,883

(22) PCT Filed: Nov. 19, 2010

(86) PCT No.: PCT/US2010/057431
§ 371 (c)(1),
(2), (4) Date: Apr. 25, 2012

(87) PCT Pub. No.: WO2011/063236
PCT Pub. Date: May 26, 2011

(65) Prior Publication Data
US 2012/0224150 A1 Sep. 6, 2012

Related U.S. Application Data

(60) Provisional application No. 61/263,524, filed on Nov. 23, 2009.

(51) Int. Cl.
*G03B 21/56* (2006.01)
(52) U.S. Cl.
CPC ..................................... *G03B 21/56* (2013.01)
USPC .......................................... 359/452; 359/449
(58) Field of Classification Search
CPC ....................................................... G03B 21/56
USPC ................................................. 359/452, 449
See application file for complete search history.

(56) References Cited

U.S. PATENT DOCUMENTS 3,194,885 A * 7/1965 Hamilton ...................... 348/834
3,549,463 A 12/1970 Frech
(Continued)

FOREIGN PATENT DOCUMENTS

EP 1398660 3/2004
JP 2000-221601 8/2000
(Continued)

OTHER PUBLICATIONS

Khaineman, Plasticheskie Massy, vol. 11, 1984, pp. 40-42.
(Continued)

*Primary Examiner* — Christ Mahoney
(74) *Attorney, Agent, or Firm* — Robert S. Moshrefzadeh

(57) ABSTRACT

A light diffusing optical construction is disclosed. The optical construction includes a symmetric optical diffuser that scatters light in a first direction with a first viewing angle $A_H$ and in a second direction orthogonal to the first direction with a second viewing angle $A_V$, where $A_V$ is substantially equal to $A_H$. The symmetric optical diffuser includes an optically transparent first layer and a plurality of randomly arranged optically transparent beads partially embedded in the first layer leaving portions of the beads exposed. The optical construction also includes a specular reflector that reflects light that is not scattered by the symmetric optical diffuser. The specular reflector has a first average reflectance $R_o$ in the visible at zero incident angle and a second average reflectance $R_{60}$ in the visible at 60 degree incident angle. $R_o/R_{60}$ is at least about 1.5. The optical construction also includes a light absorbing layer that absorbs light that is not reflected by the specular reflector.

33 Claims, 4 Drawing Sheets

(56) References Cited

U.S. PATENT DOCUMENTS

| | | | |
|---|---|---|---|
| 3,653,740 A * | 4/1972 | Ogura et al. | 359/443 |
| 4,068,922 A | 1/1978 | Dotsko | |
| 5,200,853 A | 4/1993 | Berkman | |
| 5,361,164 A | 11/1994 | Steliga | |
| 5,534,386 A | 7/1996 | Petersen | |
| 5,552,927 A | 9/1996 | Wheatly | |
| 5,867,316 A | 2/1999 | Carlson | |
| 5,903,392 A | 5/1999 | Kojima | |
| 5,956,106 A | 9/1999 | Petersen | |
| 6,031,665 A | 2/2000 | Carlson | |
| 6,067,266 A | 5/2000 | Donelan | |
| 6,091,469 A | 7/2000 | Naito | |
| 6,123,877 A | 9/2000 | Clabburn | |
| 6,141,149 A | 10/2000 | Carlson | |
| 6,299,799 B1 | 10/2001 | Craig | |
| 6,327,088 B1 * | 12/2001 | Iwata et al. | 359/599 |
| 6,352,759 B2 | 3/2002 | Savant | |
| 6,381,068 B1 | 4/2002 | Harada | |
| 6,404,548 B1 | 6/2002 | Tatsuki | |
| 6,476,965 B1 | 11/2002 | He | |
| 6,482,336 B2 | 11/2002 | Savant | |
| 6,497,946 B1 | 12/2002 | Kretman | |
| 6,529,322 B1 | 3/2003 | Jones | |
| 6,590,705 B1 | 7/2003 | Allen | |
| 6,700,702 B2 | 3/2004 | Sales | |
| 6,802,188 B1 | 10/2004 | Lieberman | |
| 6,847,425 B2 | 1/2005 | Tanada et al. | |
| 6,987,612 B2 | 1/2006 | Allen | |
| 7,278,775 B2 | 10/2007 | Yeo | |
| 7,284,866 B2 * | 10/2007 | Buchmann | 353/42 |
| 7,342,719 B1 * | 3/2008 | Kalmanash et al. | 359/452 |
| 7,399,184 B2 | 7/2008 | Hester | |
| 7,408,707 B2 | 8/2008 | Yeo | |
| 7,431,489 B2 | 10/2008 | Yeo | |
| 7,453,635 B2 | 11/2008 | Yeo | |
| 7,453,636 B2 | 11/2008 | Yeo | |
| 7,542,635 B2 | 6/2009 | Coleman | |
| 7,914,192 B2 | 3/2011 | Coleman | |
| 8,007,118 B2 | 8/2011 | O'Neill | |
| 2001/0048495 A1 | 12/2001 | Yamaguchi et al. | |
| 2002/0126378 A1 | 9/2002 | Cho | |
| 2004/0114230 A1 * | 6/2004 | Peterson et al. | 359/460 |
| 2004/0150883 A1 | 8/2004 | Shimoda | |
| 2004/0240053 A1 | 12/2004 | Shimoda | |
| 2004/0240054 A1 | 12/2004 | Aiura | |
| 2004/0252373 A1 | 12/2004 | Umeya | |
| 2005/0030480 A1 | 2/2005 | Lippey | |
| 2005/0190442 A1 | 9/2005 | Lippey | |
| 2005/0207007 A1 | 9/2005 | Shimoda | |
| 2005/0225687 A1 | 10/2005 | Yamauchi | |
| 2005/0286124 A1 | 12/2005 | Ma | |
| 2006/0109548 A1 * | 5/2006 | Goto | 359/449 |
| 2006/0290253 A1 | 12/2006 | Yeo | |
| 2007/0030415 A1 | 2/2007 | Epstein | |
| 2007/0035827 A1 | 2/2007 | Shimoda et al. | |
| 2008/0030882 A1 | 2/2008 | Ichikawa | |
| 2009/0190210 A1 * | 7/2009 | Coleman et al. | 359/452 |

FOREIGN PATENT DOCUMENTS

| | | |
|---|---|---|
| JP | 2005-107096 | 4/2005 |
| WO | WO 97-30373 | 8/1997 |
| WO | WO 99-21913 | 5/1999 |
| WO | WO 02-086618 | 10/2002 |
| WO | WO 2006-017585 | 2/2006 |
| WO | WO 2006-020583 | 2/2006 |
| WO | WO 2006-031545 | 3/2006 |
| WO | WO 2006-032002 | 3/2006 |
| WO | WO 2006-055873 | 5/2006 |
| WO | WO 2006-124588 | 11/2006 |
| WO | WO 2008-024617 | 2/2008 |
| WO | WO 2008-061027 | 5/2008 |
| WO | WO 2008-061054 | 5/2008 |
| WO | WO 2008-061059 | 5/2008 |
| WO | WO 2008-061061 | 5/2008 |
| WO | WO 2008-061125 | 5/2008 |
| WO | WO 2010-080775 | 7/2010 |
| WO | WO 2010-081006 | 7/2010 |

OTHER PUBLICATIONS

Wenig, Crystallization kinetics of isotactic polypropylene blended with atactic polystyrene, Colloid and Polymer Science, (1990), vol. 268, No. 6, pp. 528-535.

Intl Search Report for PCT/US2010/057431, mailed on Mar. 7, 2011, 4 pages.

Written Opinion for PCT/US2010/057431, mailed on Mar. 7, 2011, 7 pages.

* cited by examiner

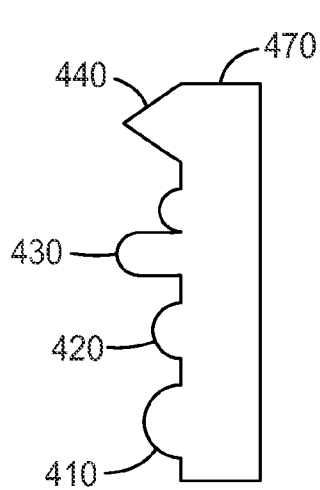
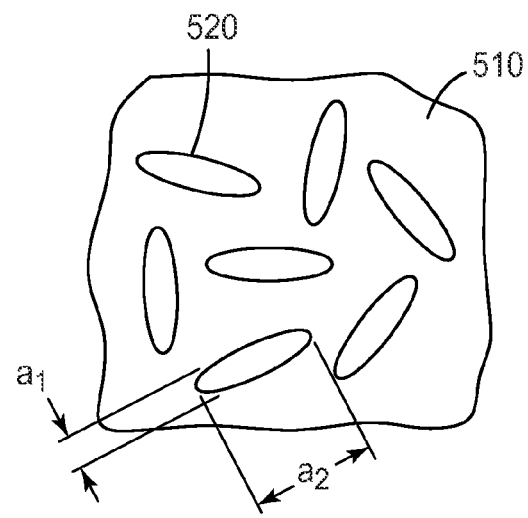
FIG. 4    FIG. 5
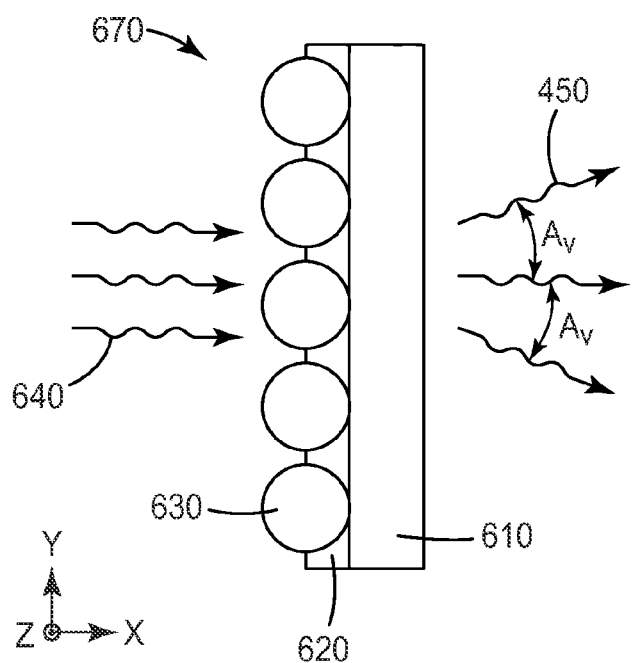
FIG. 6

FRONT PROJECTION SCREEN WITH HIGH CONTRAST

CROSS REFERENCE TO RELATED APPLICATIONS

This application is a national stage filing under 35 U.S.C. 371 of PCT/US2010/057431 filed Nov. 19, 2010, which claims priority to U.S. Provisional Application No. 61/263,524, filed Nov. 23, 2009, the disclosure of which is incorporated by reference in their entirety herein.

FIELD OF THE INVENTION

This invention generally relates to projection screens. The invention is particularly applicable to symmetric front projection screens having high optical gain and contrast.

BACKGROUND

Display devices generally display information to a viewer. The performance of a display is described in terms of various characteristics of the display. One such characteristic is the ability of the display to absorb ambient light originated from various sources of light such as a light bulb in a room or on a street or the sun. Generally, ambient light that is incident on a display and not absorbed by the display is superimposed on the displayed information resulting in reduced image contrast. The reduced contrast due to ambient light is generally referred to as washout. Washout is especially a concern in applications where the ambient light is very bright. For example, in outdoor applications, ambient light from the sun can significantly reduce the display contrast making it difficult for a viewer to discern the displayed information. A display, such as an instrument panel used in a motor vehicle, is particularly susceptible to washout from sun light. Typically, the display is placed in a housing to reduce ambient light access to the display. The housing is generally made black to further reduce washout by reducing the amount of light that is reflected by the housing.

Another characteristic of a display is the viewing angle. It is generally desirable that the displayed information be easily viewable over a predetermined range of viewing angles along the horizontal and vertical directions. As one display characteristic is improved, one or more other display characteristics often degrade. As a result, certain tradeoffs are made in a display device in order to best meet the performance criteria for a given display application. Thus, there remains a need for displays with improved overall performance while meeting the minimum performance criteria.

SUMMARY OF THE INVENTION

Generally, the present invention relates to projection screens. The present invention also relates to projection systems that can display an image with high brightness and contrast.

In one embodiment, a light diffusing optical construction includes a symmetric optical diffuser that scatters light in a first direction with a first viewing angle $A_H$ and in a second direction orthogonal to the first direction with a second viewing angle $A_V$ substantially equal to $A_H$. The symmetric optical diffuser includes a first layer and a plurality of beads partially embedded in the first layer leaving portions of the beads exposed. The optical construction also includes a reflector that reflects light that is not scattered by the symmetric optical diffuser and has a first average reflectance $R_o$ in the visible at zero incident angle and a second average reflectance $R_{60}$ in the visible at 60 degree incident angle. $R_o/R_{60}$ is at least about 1.5. The optical construction also includes a light absorbing layer that absorbs light that is not reflected by the specular reflector. In some cases, $A_H/A_V$ is not greater than about 1.2, or not greater than about 1.1. In some cases, the average optical transmission of the first layer is not less than about 70%, or not less than about 80%. In some cases, the average optical transmission of the beads is not less than about 70%, or not less than about 80%. In some cases, the beads are substantially spherical. In some cases, the beads have an index of refraction that is in a range from about 1.3 to about 3.2, or from about 1.4 to about 2.5, or from about 1.4 to about 2. In some cases, the difference between the index of refraction of the beads and the index of refraction of the first layer is not greater than about 0.05, or not greater than about 0.03, or not greater than about 0.02. In some cases, the symmetric optical diffuser is polarization-insensitive. In such cases, the gain curves of the symmetric optical diffuser for two mutually orthogonal polarized incident lights differ by no more than about 10%, or by no more than about 5%. In some cases, the ratio of the specular reflectance to the total reflectance of the specular reflector at a visible wavelength is not less than about 0.7, or not less than about 0.8, or not less than about 0.9. In some cases, $R_o/R_{60}$ is at least about 1.7, or at least about 2. In some cases, the specular reflector includes a flat reflectance spectrum in the visible. In some cases, the ratio of the reflectance at a blue wavelength and the reflectance at a red wavelength of the specular reflector is in a range from about 0.8 to about 1.2, or from about 0.9 to about 1.1. In some cases, a front projection screen includes the light diffusing optical construction. In some cases, a projection system includes one or more image forming devices that project an image onto a display plane and the light diffusing optical construction positioned in the display plane. In such cases, the output light of the one or more image forming devices can be polarized or unpolarized.

In another embodiment, a light diffusing optical construction includes a symmetric optical diffuser that includes a plurality of randomly arranged microlenses. The optical diffuser scatters light in a first direction with a first viewing angle $A_H$ and in a second direction orthogonal to the first direction with a second viewing angle $A_V$ that is substantially equal to $A_H$. The optical construction also includes a specular reflector that reflects light that is not scattered by the symmetric optical diffuser. The reflector has a first average reflectance $R_o$ in the visible at zero incident angle and a second average reflectance $R_{60}$ in the visible at 60 degree incident angle. The ratio $R_o/R_{60}$ is at least about 1.5. The optical construction also includes a light absorbing layer that absorbs light that is not reflected by the specular reflector. In some cases, the plurality of randomly arranged microlenses includes a plurality of randomly arranged particles that are partially embedded in a first layer and partially exposed.

In another embodiment, a projection system includes an image projecting light source that projects an image light generally along a first direction onto an image plane. The first direction makes an angle $\theta_1$ with the horizontal direction. The projection system also includes an ambient light source that emits ambient light generally along a second direction that makes an angle $\theta_2$ with the horizontal direction. The projection system also includes a symmetric optical diffuser that is placed in the image plane and has a first viewing angle $A_H$ along the horizontal direction and a second viewing angle $A_V$ along the vertical direction. $A_H$ is equal to $A_V$. $A_V/2$ is greater than $\theta_1$ and smaller than $\theta_2$. The projection system also includes a specular reflector that reflects light that is not scattered by the symmetric optical diffuser and has a first average reflectance $R_1$ in the visible at an incident angle of about $\theta_1$ and a second average reflectance $R_2$ in the visible at an incident angle of about $\theta_2$, where $R_1/R_2$ is at least about 1.5.

BRIEF DESCRIPTION OF DRAWINGS

The invention may be more completely understood and appreciated in consideration of the following detailed description of various embodiments of the invention in connection with the accompanying drawings, in which:

FIG. 4 is a schematic side-view of an optical diffuser;
FIG. 5 is a schematic top-view of a structured surface;
FIG. 6 is a schematic side-view of another optical diffuser.

In the specification, a same reference numeral used in multiple figures refers to the same or similar elements having the same or similar properties and functionalities.

DETAILED DESCRIPTION

The present invention is generally related to projection screens. The disclosed projection screens have symmetric viewing angles and are capable of displaying an image with high contrast, high brightness and high optical gain. In some cases, the disclosed projection screens redirect a desired light, such as light from an image projector, to a viewer, and redirect an undesired light, such as light from an ambient light source, away from the viewer. The disclosed screens are particularly suited for display devices used outdoors or in well-lit environments.

The disclosed screen utilize different mechanisms for enhancing image brightness and absorbing ambient light. The screens incorporate an angle-sensitive specular reflector that has high reflectance for smaller incident angles and low reflectance for larger incident angles. Image rays typically have smaller incident angles and are reflected by the specular reflector. Ambient light rays, on the other hand, typically have larger incident angles and are transmitted by the specular reflector and are absorbed by a light absorbing layer. By selectively reflecting desired image rays and transmitting undesired ambient light rays, the disclosed screens provide images with high brightness and contrast.

Figure 1:
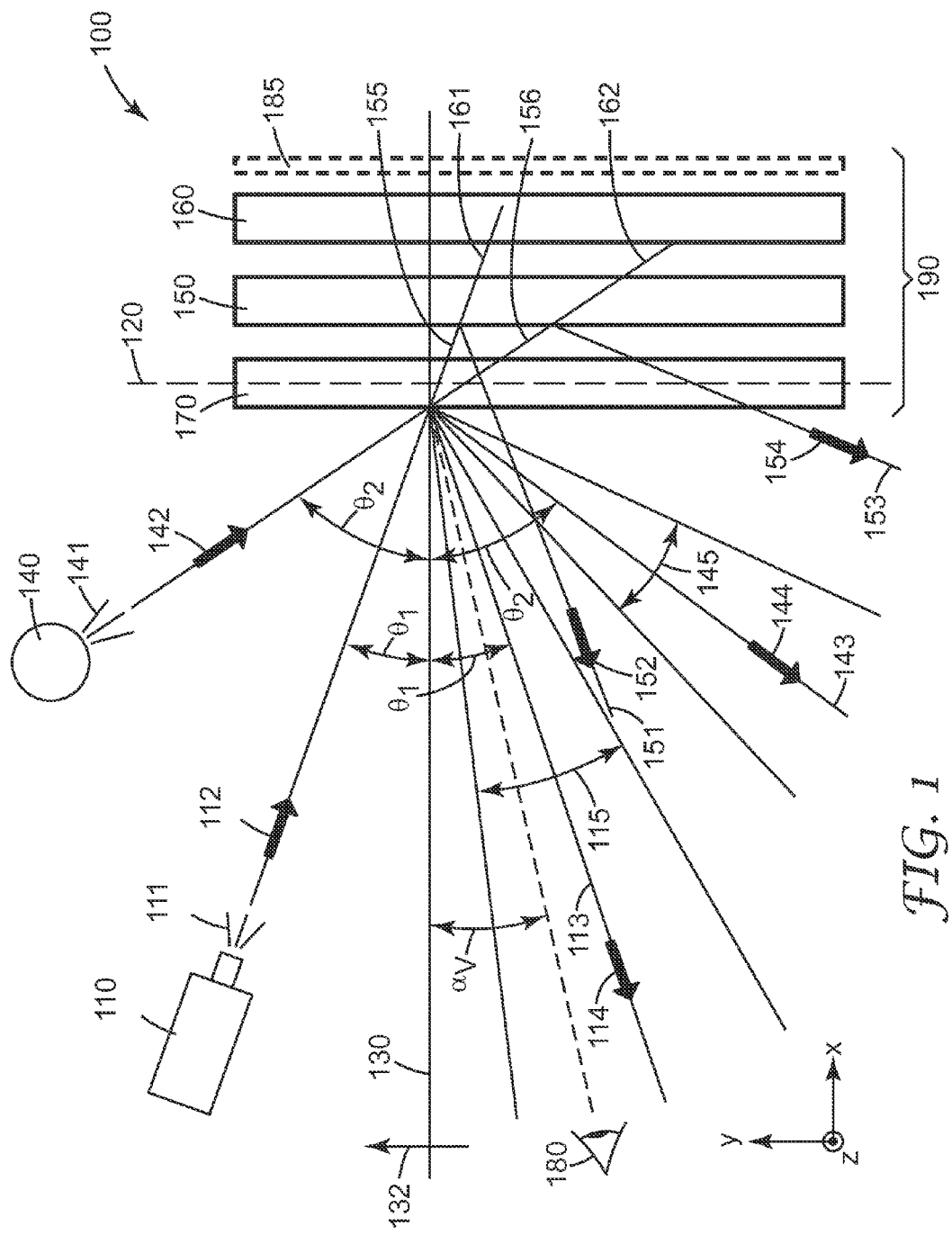
FIG. 1 is a schematic side-view of a projection system.

FIG. 1 is a schematic side-view of a projection system 100 that generally defines three orthogonal axes x, y and z. Projection system 100 includes an image projecting light source 110, an ambient light source 140, and a light diffusing optical construction 190 that includes a symmetric optical diffuser 170, a substantially specular reflector 150, and a light absorbing layer 160.

Image projecting light source 110 projects an image light 111 generally along a first direction 112 onto an image plane 120. First direction 112 makes an angle $\theta_1$ with a horizontal direction 130 along the x-axis. In some cases, angle $\theta_1$ is substantially equal to zero. In such cases, the angle $\theta_1$ is less than about 20 degrees, or less than about 15 degrees, or less than about 10 degrees, or less than about 5 degrees, or less than about 3 degrees.

Ambient light source 140 emits ambient light 141 generally along a second direction 142 that makes an angle $\theta_2$ with horizontal direction 130. In some cases, the angle $\theta_2$ is substantially larger than the angle $\theta_1$. In such cases, the angle $\theta_2$ is greater than the angle $\theta_1$ by at least about 20 degrees, or at least about 30 degrees, or at least about 40 degrees, or at least about 50 degrees, or at least about 60 degrees, or at least about 70 degrees. In some cases, the angle $\theta_2$ is greater than about 40 degrees, or greater than about 50 degrees, or greater than about 60 degrees, or greater than about 70 degrees.

Figure 2:
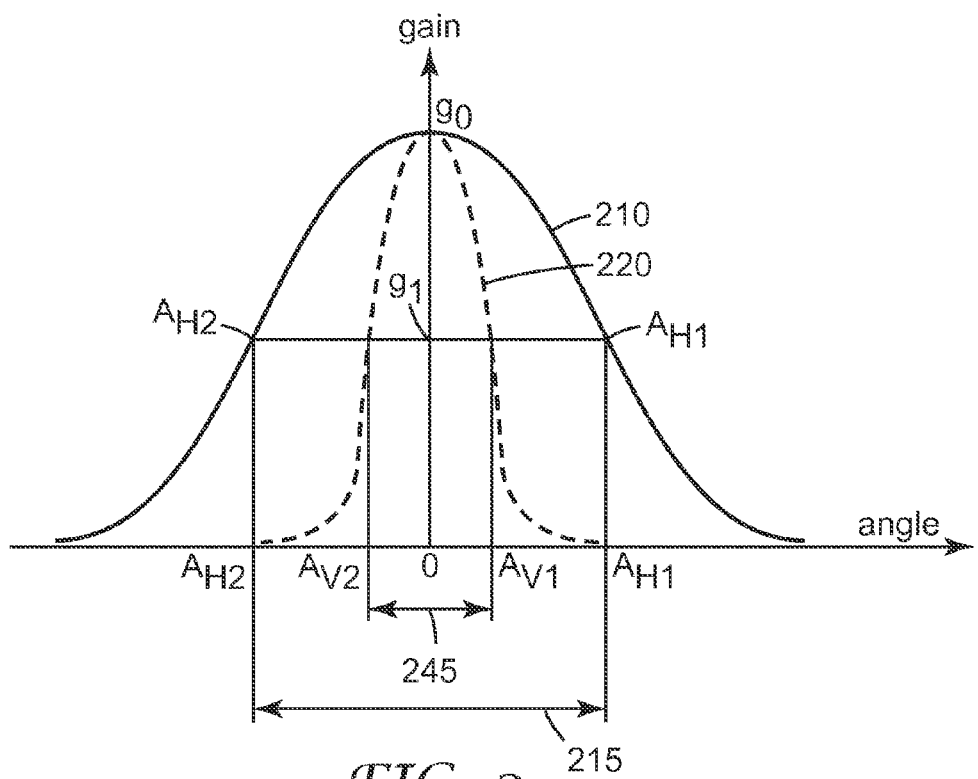
FIG. 2 is schematic plots of horizontal and vertical gain curves for a projection screen.

Symmetric optical diffuser 170 symetrically scatters an incident light along different directions. For example, symmetric optical diffuser 170 symetrically scatters light along horizontal direction 130 parallel to the x-direction and along a vertical direction 132 that is parallel to the y-direction. FIG. 2 is schematic plots of respective horizontal and vertical gain curves 210 and 220 of symmetric optical diffuser 170 along the mutually orthogonal horizontal and vertical directions. Symmetric optical diffuser 170 has a maximum gain $g_o$ that corresponds to the on-axis or zero viewing angle and a half-maximum gain $g_1=g_o/2$ that defines a horizontal viewing angle $A_H$ (215) that is equal to $A_{H1}-A_{H2}$ and a vertical viewing angle $A_V$ (245) that is equal to $A_{V1}-A_{V2}$. $A_{H1}$ and $A_{H2}$ may be referred to as the positive and negative horizontal viewing angles, respectively, and $A_{V1}$ and $A_{V2}$ may be referred to as the positive and negative vertical viewing angles, respectively. In the exemplary gain plots of FIG. 2, each of gain curves 210 and 220 is symmetric about the on-axis viewing direction. In general, gain curves 210 and 220 may or may not be symmetric about the on-axis viewing direction. For example, in some cases, the positive viewing angle $A_{H1}$ corresponding to the half-brightness viewing angle for positive viewing angles may be different than the negative viewing angle $A_{H2}$ corresponding to the half-brightness viewing angle for negative viewing angles.

Referring back to FIG. 1, optical diffuser 170 is a symmetric optical diffuser meaning that viewing angles $A_H$ and $A_V$ are substantially equal meaning that the difference between $A_H$ and $A_V$ is less than about 10 degrees, or less than about 8 degrees, or less than about 6 degrees, or less than about 5 degrees, or less than about 4 degrees, or less than about 2 degrees. In some cases, symmetric optical diffuser 170 scatters light in a first direction, such as the horizontal direction, with a first viewing angle $A_H$, and in a second direction orthogonal to the first direction, such as the vertical direction, with a second viewing angle $A_V$, where the large of the two ratios $A_H/A_V$ and $A_V/A_H$ is not greater than about 1.1, or not greater than about 1.08, or not greater than about 1.06, or not greater than about 1.04, or not greater than about 1.02.

Symmetric optical diffuser 170 is placed in image plane 120 along vertical direction 132. Symmetric diffuser 170 receives image light 111 and scatters the image light to form a scattered image light 113 propagating generally along a second direction 114. In some cases, directions 112 and 114 are symmetric about the x-axis. In such cases, second direction 114 makes an angle $\theta_1$ with horizontal direction 130. In some cases, scattered image light 113 has a vertical image light cone 115 that includes or covers a desired viewing position 180 that makes an angle $\alpha_V$ with horizontal direction 130.

Symmetric diffuser 170 receives ambient light 141 and scatters the ambient light to form a scattered ambient light 143 propagating generally along a fourth direction 144. In some cases, directions 142 and 144 are symmetric about horizontal direction 130. In such cases, fourth direction 144 makes an angle $\theta_2$ with horizontal direction 130. In some cases, scattered ambient light 143 has a vertical ambient light cone 145 that does not include or does not cover desired viewing position 180.

In some cases, viewing position 180 is included in, or is positioned within, vertical image light cone 115, but not vertical ambient light cone 145. In such cases, a viewer in viewing position 180 can see an image with high contrast as such an image does not include, or includes very little, ambient light originating from ambient light source 140. In some cases, the viewing angle of symmetric diffuser 170 is sufficiently large so than vertical image light cone 115 includes or covers viewing position 180, and sufficiently small so that vertical ambient light cone 145 does not include viewing position 180.

Figure 3:
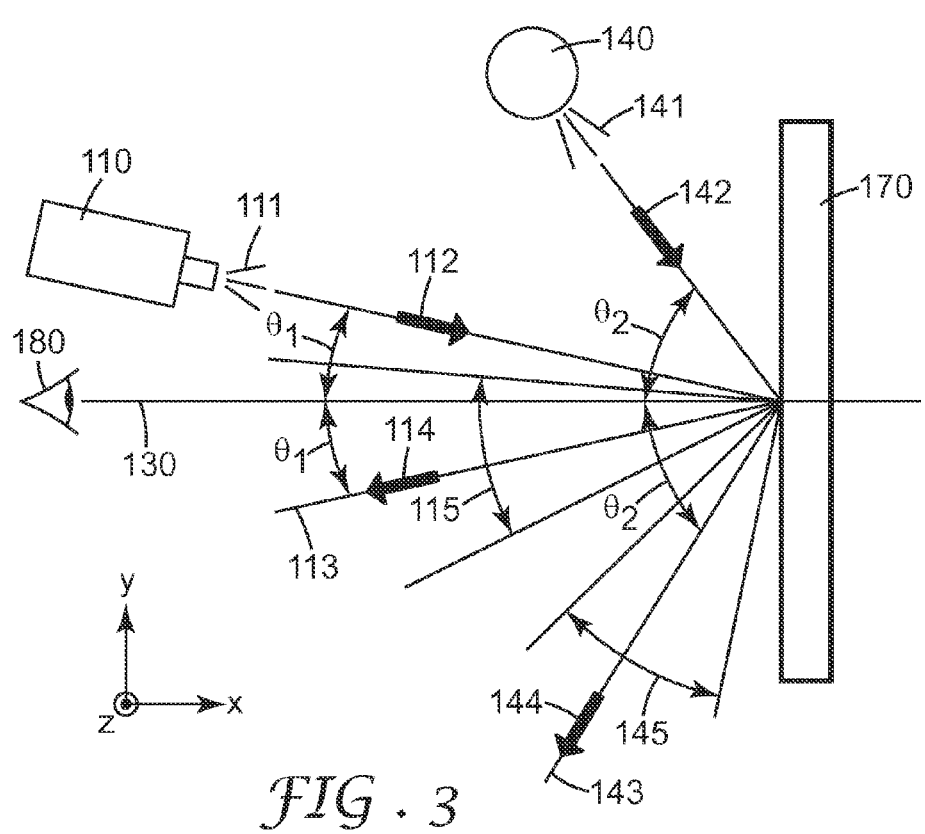
FIG. 3 is a schematic side-view of a projection system.

In some cases, such as when the angle $\alpha_V$ is substantially equal to zero as shown schematically in FIG. 3, image light that is scattered by symmetric diffuser 170 reaches viewing position 180 and ambient light that is scattered by the diffuser propagates away from the viewing position. In such cases, the half vertical viewing angle ($A_V/2$) of diffuser 170 is greater than $\theta_1$ and smaller than $\theta_2$. In such cases, a viewer in viewing position 180 observes a displayed image with enhanced contrast.

Reflector 150 reflects image light 155 that is not scattered by optical diffuser 170. In some cases, reflector 150 is substantially a specular reflector. In such cases, a substantial fraction of the total light reflected by reflector 150 is reflected specularly and only a small fraction of the total reflected light is reflected diffusely. For example, in such cases, the ratio of the specular reflectance to the total reflectance of reflector 150 at a visible wavelength is at least about 0.7, or at least about 0.75, or at least about 0.8, or at least about 0.85, or at least about 0.9, or at least about 0.95, where the visible wavelength can be any wavelength in the visible range of the electromagnetic spectrum. In some cases, the visible range is from about 400 nm to about 690 nm, or from about 410 nm to about 680 nm, or from about 420 nm to about 670 nm.

Reflector 150 specularly reflects image light 155 as reflected image light 151 along a fifth direction 152 that makes an angle $\theta_1$ with the horizontal direction. Reflector 150 reflects ambient light 156 that is not scattered by optical diffuser 170. Reflector 150 specularly reflects ambient light 156 as reflected ambient light 153 along a sixth direction 154 that makes an angle $\theta_2$ with the horizontal direction. In some cases, the locations of viewing position 180, image projecting light source 110, and ambient light source 140 are such that a viewer in viewing position 180 receives and views reflected image light 151 but not reflected ambient light 153. In such cases, specular reflector 150 reflects image light 155 that is not scattered by symmetric optical diffuser 170 towards the viewing position and reflects ambient light 156 that is not scattered by symmetric optical diffuser 170 away from the viewing position. In such cases, a viewer positioned in viewing position 180 can observe an image with increased contrast.

In some cases, the reflectance of specular reflector 150 does not change, or changes very little, with increasing incident angle. In such cases, specular reflector 150 has a first average reflectance $R_1$ in the visible at an incident angle of about $\theta_1$ and a second average reflectance $R_2$ in the visible at an incident angle of about $\theta_2$, where the difference between $R_1$ and $R_2$ is no more than about 10%, or no more than about 5%, or no more than about 2%. In some cases, the angle $\theta_1$ is about zero and the angle $\theta_2$ is about 45 degrees. In some cases, the angle $\theta_1$ is about zero and the angle $\theta_2$ is about 60 degrees.

In some cases, the reflectance of specular reflector 150 changes, such as decreases, with increasing incident angle. In some cases, such as when angle $\theta_1$ is substantially less than angle $\theta_2$, a reflector 150 that has decreasing reflectance with increasing incident angle can increase the contrast of an image that is displayed to a viewing position, such as viewing position 180. In some cases, specular reflector 150 has a first average reflectance $R_1$ in the visible at an incident angle of about $\theta_1$ and a second average reflectance $R_2$ in the visible at an incident angle of about $\theta_2$, where the ratio $R_1/R_2$ is at least about 1.2, or at least about 1.4, or at least about 1.5, or at least about 1.6, or at least about 1.8, or at least about 2, or at least about 2.5, or at least about 3. In some cases, the angle $\theta_1$ is about zero and the angle $\theta_2$ is about 45 degrees. In some cases, the angle $\theta_1$ is about zero and the angle $\theta_2$ is about 60 degrees.

In some cases, specular reflector 150 can have a substantially flat reflectance spectrum in a region, such as the visible region, of the electromagnetic spectrum. For example, in such cases, the reflectance of the specular reflector changes by no more than 20%, or by no more than 15%, or by no more than 10%, or by no more than 5% in the visible. In some cases, the ratio of the reflectance of reflector 150 at a blue wavelength, such as at 440 nm, and the reflectance at a red wavelength, such as at 620 nm, is in a range from about 0.8 to about 1.2, or in a range from about 0.9 to about 1.1.

In general, specular reflector 150 can be any specular reflector that may be desirable and/or practical in an application. For example, specular reflector 150 can be an aluminized film, a multilayer inorganic dielectric film, or a multilayer polymeric reflective film, such as a reflective polarizing film or a Vikuiti ESR film available from 3M Company, St. Paul, Minn.

Light absorbing layer 160 can increase the contrast of a displayed image by absorbing image light 161 and ambient light 162 that are not reflected by specular reflector 150. Light absorbing layer 160 can include any light absorbing material that may be desirable and/or practical in an application. For example, layer 160 can include carbon black, light absorptive dyes such as black dyes or other dark dyes, light absorptive pigments or other dark pigments, or opaque particles, dispersed in a binder material. Suitable binders include thermoplastics, radiation curable or thermoset acrylates, epoxies, silicone-based materials, or other suitable binder materials. In some cases, the optical absorption coefficient of light absorbing layer 160 in the visible, is at least about 0.1 inverse microns, or at least about 0.2 inverse microns, or at least about 0.4 inverse microns, or at least about 0.6 inverse microns.

In some cases, optical construction 190 includes an optional substrate 185. In some cases, substrate 185 can primarily provide support for the other components in the optical construction. In some cases, substrate 185 can provide one or more additional optical functions. For example, substrate 185 can be or include an optical diffuser, a broadband light absorber, an absorbing polarizer, a reflective polarizer, or any other film with a function that may be desirable in an application. Substrate 185 can be any material that may be suitable and/or practical in an application, such as polyethylene terapthalate (PET), polyvinyl chloride (PVC), polycarbonates, acrylics, aluminum sheet, and glass, and composites thereof.

In general, optical construction 190 can be employed in any application where it may be desirable to scatter light symmetrically. For example, optical construction 190 can be, or be part of, a front projection screen.

Image projecting light source 110 includes an image forming device and projects an image formed by the device onto display or image plane 120. Output light 111 of projector 110 can have any polarization that may be desirable in an application. For example, in some cases, output light 111 is substantially unpolarized. In such cases, the ratio of the intensity of output light 111 having a first polarization state and the intensity of output light having a second polarization state normal to the first polarization state is in a range from about 0.8 to about 1.2, or from about 0.85 to about 1.15, or from about 0.9 to about 1.1, or from about 0.95 to about 1.05. In some cases, output light 111 is substantially polarized, for example, along a first direction. In such cases, the ratio of the intensity of output light 111 having a first polarization state to the intensity of output light having an orthogonal polarization state is at least about 100, or at least about 500, or at least about 1000. In some cases, output light 110 includes a mixture of polarization states. For example, in some cases, output light 110 can include red, green and blue lights where the blue and red lights have one polarization state and the green light has an orthogonal polarization state.

In general, image projecting light source 110 can include any image forming device. For example, the image forming device can be a reflective display, a transmissive display, or an emissive display, or a combination of different display types, such as a transflective display. For example, in some cases, a reflective image forming device can include an array of liquid crystals, or a digital micro-mirror array, such as a Digital Light Processor (DLP) from Texas Instruments, Inc.

In general, symmetric optical diffuser 170 can be any symmetric diffuser that may be desirable and/or practical in an application. For example, symmetric diffuser 170 can be a bulk diffuser and/or a surface diffuser. Bulk diffusion can be achieved by, for example, incorporating or dispersing small particles of a guest material in a host material where the guest and host materials have different indices of refraction. Surface diffusion can be achieved by, for example, making the surface of the diffuser matte. In some cases, diffuser 170 is a bulk diffuser and the difference between the indices of refraction of the guest and host materials is at least about 0.01, or at least about 0.02, or at least about 0.03, or at least about 0.04.

In some cases, symmetric optical diffuser 170 can be substantially polarization-insensitive. In such cases, the gain curves, such as horizontal gain curves 210, of the symmetric optical diffuser for two mutually orthogonal polarized incident lights along a given direction, such as the horizontal direction, are substantially the same. For example, in such cases, horizontal gain curves 210 for two mutually orthogonal polarized incident lights along the horizontal direction differ by no more than about 15%, or by no more than about 10%, or by no more than about 5%. As another example, vertical gain curves 220 for two mutually orthogonal polarized incident lights along the vertical direction differ by no more than about 15%, or by no more than about 10%, or by no more than about 5%.

In some cases, symmetric optical diffuser 170 can include a structured surface or layer. The structured layer can include randomly arranged structures having any shape that may be desirable in an application. Exemplary shapes includes planar, concave, convex, spheric, aspheric, Fresnel, ellipsoidal, fibril, diffractive, and faceted shapes. For example, FIG. 4 is a schematic side-view of a symmetric optical diffuser 470 that includes a structured surface 410 that includes a plurality of randomly arranged structures or optical lenses, such as microlenses, 420. In some cases, structures 420 can have different shapes. For example, some structures, such as structure 430, can have curved facets, and some structures, such as structure 440, can have planar facets. In some cases, at least some of the structures 420 can be anamorphic for, for example, altering the aspect ratio of an image projected by image projecting light source 110. In some cases, an anamorphic lens or structure can be or include an elongated, such a cylindrical, lens. In some cases, symmetric optical diffuser 170 can include an array of randomly arranged elongated optical lenses, such as an array of randomly arranged cylindrical lenses. For example, FIG. 5 is a schematic top-view of a structured surface 510, similar to structured surface 410, that includes a plurality of randomly arranged and oriented lenslets 520. Each lenslet has a width $a_1$, a length $a_2$, and an aspect ratio $a_2/a_1$. In some cases, the aspect ratio is in a range from about 1.5 to about 200, or from about 2 to about 100, or from about 2 to about 50, or from about 2 to about 25. Structured surface 510 is a symmetric optical diffuser meaning that the surface scatters light symmetrically along two mutually orthogonal directions.

In some cases, symmetric optical diffuser 170 is a bulk diffuser and includes a plurality of elongated structures or particles of a first material randomly arranged and oriented within a second material where the two materials have different indices of refraction. In some cases, the length of an elongated particle is in a range from about 50 nm to about 100 microns, or from about 100 nm to about 50 microns, or from about 200 nm to about 10 microns. In some cases, the aspect ratio of an elongated particle is in a range from about 5:1 to about 1000:1, or from about 10:1 to about 200:1, or from about 20:1 to about 50:1.

FIG. 6 is a schematic side-view of a symmetric optical diffuser 670, similar to optical diffuser 170, that includes a substrate 610, a substantially optically transparent first layer 620 disposed on the substrate, and a plurality of substantially randomly arranged optically transparent beads 630 partially embedded in the first layer. Substrate 610 is substantially optically transparent meaning that the average optical transmission of the first layer is not less than about 60%, or not less than about 70%, or not less than about 80%, or not less than about 90%. Beads 630 are substantially optically transparent meaning that the average optical transmission of the beads is not less than about 60%, or not less than about 70%, or not less than about 80%, or not less than about 90%.

Beads 630 can have any shape that may be desirable in an application. For example, in some cases, beads 630 can be any three-dimensional curvilinear or rectilinear body. For example, in some cases, beads 620 can be substantially spherical or spheres, spheroids or ellipsoids. In some cases, beads 630 have an index of refraction that is in a range from about 1.3 to about 3.2, or from about 1.3 to about 3, or from about 1.4 to about 3, or from about 1.4 to about 2.5, or from about 1.4 to about 2.3, or from about 1.4 to about 2.1, or from about 1.4 to about 2. In some cases, the beads and the first layer have substantially equal indices of refraction. For example, in such cases, the difference between the index of refraction of the beads and the index of refraction of the first layer is not greater than about 0.05, or not greater than about 0.04, or not greater than about 0.03, or not greater than about 0.02, or not greater than about 0.01. Beads 630 can have any diameter or range of diameters that may be desirable in an application. In some cases, beads 630 have an average diameter that is not less than about 2 microns, or not less than about 4 microns, or not less than about 5 microns, or not less than about 6 microns, or not less than about 8 microns, or not less than about 10 microns, or not less than about 15 microns, or not less than about 20 microns. In some cases, beads 630 have a diameter in a range from about 1 micron to about 100 microns, or from about 2 microns to about 80 microns, or from about 2 microns to about 60 microns, or from about 2 microns to about 60 microns, or from about 5 microns to about 50 microns, or from about 5 microns to about 40 microns, or from about 5 microns to about 30 microns, or from about 5 microns to about 20 microns.

In some cases, optical construction 190 is an integrated construction meaning that the individual components in the construction are attached to one another by, for example, one or more adhesive layers.

Some of the advantages of the disclosed systems and constructions are further illustrated by the following example. The particular materials, amounts and dimensions recited in this example, as well as other conditions and details, should not be construed to unduly limit the present invention.

EXAMPLE 1

Figure 7:
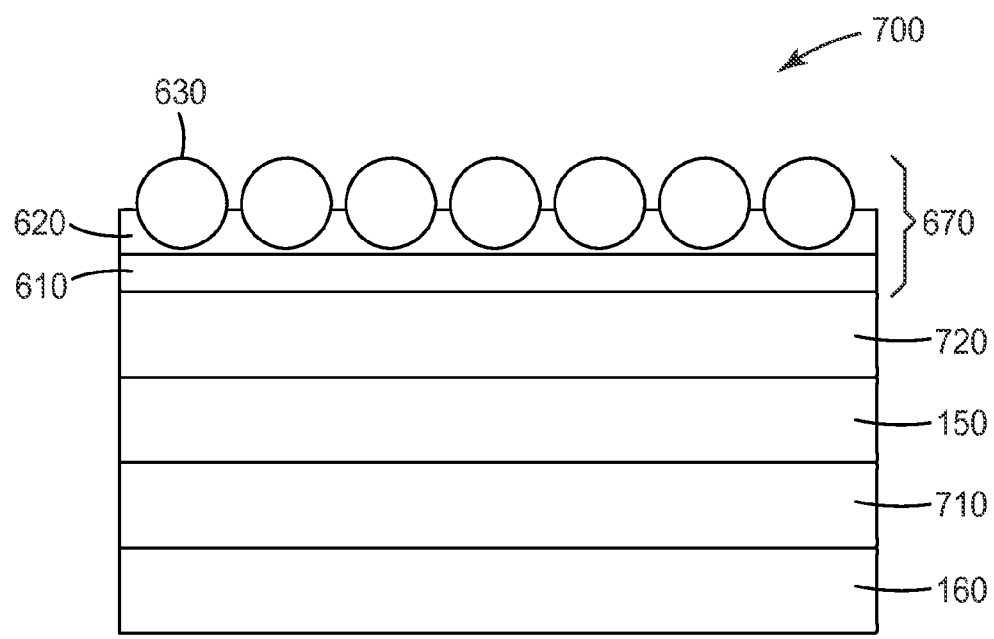
FIG. 7 is a schematic side-view of an optical construction.

An optical construction 700, a schematic side-view of which is shown in FIG. 7, was fabricated. The optical construction includes light absorbing layer 160, specular reflector 150 laminated to the light absorbing layer via a first optical adhesive layer 710, and symmetric optical diffuser 670 laminated to the specular reflector via a second optical adhesive layer 720. first and second optical adhesive layers included optically clear adhesive OCA-8171 available from 3M Company, St. Paul, Minn. Light absorbing layer 160 was a light absorbing black film (ScotchCal Graphic Film 7725 available from 3M Company, St. Paul, Minn.).

Specular reflector 150 was a narrow-band specular reflector film (c-ESR) available from 3M Company, St. Paul, Minn. The specular reflector had a reflectance of about 99% in the wavelength range from about 400 nm to about 700 nm at normal incidence. The ratio of the average reflectance of the specular reflector in the visible at zero incident angle to 60 degrees incident angle was about 1.7.

Substrate 610 in symmetric optical diffuser 670 had an average optical transmission of about 95%. First layer 620 had an index of refraction of about 1.49, an average optical transmission of about 90%, and an average thickness of about 10 microns. Beads 630 were substantially spherical and had an index of refraction of about 1.49, an average optical transmission of about 90%, and an average diameter of about 8 microns. The beads were randomly arranged and partially embedded in first layer 620 leaving portions of the beads exposed. Optical construction 700 had an on-axis optical gain of about 2.9. The total optical reflectance of the optical construction was about 42% greater than a reflective lambertian diffuser. The optical construction had a horizontal viewing angle of about 54 degrees and a vertical viewing angle of about 54 degrees. The optical construction absorbed about 43% of ambient light at 300 lux.

Item 1 is a light diffusing optical construction comprising:

a symmetric optical diffuser scattering light in a first direction with a first viewing angle $A_H$ and in a second direction orthogonal to the first direction with a second viewing angle $A_V$ substantially equal to $A_H$, the symmetric optical diffuser comprising: a substantially optically transparent first layer; and a plurality of substantially randomly arranged optically transparent beads partially embedded in the first layer;

a substantially specular reflector reflecting light that is not scattered by the symmetric optical diffuser and having a first average reflectance $R_o$ in the visible at a substantially zero incident angle and a second average reflectance $R_{60}$ in the visible at a substantially 60 degree incident angle, $R_o/R_{60}$ being at least about 1.5; and a light absorbing layer absorbing light that is not reflected by the specular reflector.

Item 2 is the light diffusing optical construction of item 1, wherein $A_H/A_V$ is not greater than about 1.2.

Item 3 is the light diffusing optical construction of item 1, wherein $A_H/A_V$ is not greater than about 1.1.

Item 4 is the light diffusing optical construction of item 1, wherein an average optical transmission of the first layer is not less than about 70%.

Item 5 is the light diffusing optical construction of item 1, wherein an average optical transmission of the first layer is not less than about 80%.

Item 6 is the light diffusing optical construction of item 1, wherein an average optical transmission of the beads is not less than about 70%.

Item 7 is the light diffusing optical construction of item 1, wherein an average optical transmission of the beads is not less than about 80%.

Item 8 is the light diffusing optical construction of item 1, wherein the beads are substantially spherical.

Item 9 is the light diffusing optical construction of item 1, wherein the beads have an index of refraction that is in a range from about 1.3 to about 3.2.

Item 10 is the light diffusing optical construction of item 1, wherein the beads have an index of refraction that is in a range from about 1.4 to about 2.5.

Item 11 is the light diffusing optical construction of item 1, wherein the beads have an index of refraction that is in a range from about 1.4 to about 2.

Item 12 is the light diffusing optical construction of item 1, wherein a difference between an index of refraction of the beads and an index of refraction of the first layer is not greater than about 0.05.

Item 13 is the light diffusing optical construction of item 1, wherein a difference between an index of refraction of the beads and an index of refraction of the first layer is not greater than about 0.03.

Item 14 is the light diffusing optical construction of item 1, wherein a difference between an index of refraction of the beads and an index of refraction of the first layer is not greater than about 0.02.

Item 15 is the light diffusing optical construction of item 1, wherein the symmetric optical diffuser is substantially polarization-insensitive.

Item 16 is the light diffusing optical construction of item 15, wherein gain curves of the symmetric optical diffuser for two mutually orthogonal polarized incident lights differ by no more than about 10%.

Item 17 is the light diffusing optical construction of item 15, wherein gain curves of the symmetric optical diffuser for two mutually orthogonal polarized incident lights differ by no more than about 5%.

Item 18 is the light diffusing optical construction of item 1, wherein a ratio of a specular reflectance to a total reflectance of the substantially specular reflector at a visible wavelength is not less than about 0.7.

Item 19 is the light diffusing optical construction of item 1, wherein a ratio of a specular reflectance to a total reflectance of the substantially specular reflector at a visible wavelength is not less than about 0.8.

Item 20 is the light diffusing optical construction of item 1, wherein a ratio of a specular reflectance to a total reflectance of the substantially specular reflector at a visible wavelength is not less than about 0.9.

Item 21 is the light diffusing optical construction of item 1, wherein $R_o/R_{60}$ is at least about 1.7.

Item 22 is the light diffusing optical construction of item 1, wherein $R_o/R_{60}$ is at least about 2.

Item 23 is the light diffusing optical construction of item 1, wherein the substantially specular reflector comprises a substantially flat reflectance spectrum in the visible.

Item 24 is the light diffusing optical construction of item 23, wherein a ratio of a reflectance at a blue wavelength and a reflectance at a red wavelength of the substantially specular reflector is in a range from about 0.8 to about 1.2.

Item 25 is the light diffusing optical construction of item 23, wherein a ratio of a reflectance at a blue wavelength and a reflectance at a red wavelength of the substantially specular reflector is in a range from about 0.9 to about 1.1.

Item 26 is a front projection screen comprising the light diffusing optical construction of item 1.

Item 27 is a projection system comprising: one or more image forming devices projecting an image onto a display plane; and the light diffusing optical construction of item 1 positioned in the display plane.

Item 28 is the projection system of item 27, wherein an output light of the one or more image forming devices is substantially unpolarized.

Item 29 is the projection system of item 27, wherein the one or more image forming devices comprises a digital micromirror array.

Item 30 is the projection system of item 27, wherein the one or more image forming devices comprises a liquid crystal array.

Item 31 is a light diffusing optical construction comprising:

a symmetric optical diffuser comprising a plurality of substantially randomly arranged microlenses and scattering light in a first direction with a first viewing angle $A_H$ and in a second direction orthogonal to the first direction with a second viewing angle $A_V$ substantially equal to $A_H$;

a substantially specular reflector reflecting light that is not scattered by the symmetric optical diffuser and having a first average reflectance $R_o$ in the visible at a substantially zero incident angle and a second average reflectance $R_{60}$ in the visible at a substantially 60 degree incident angle, $R_o/R_{60}$ being at least about 1.5; and a light absorbing layer absorbing light that is not reflected by the specular reflector.

Item 32 is the light diffusing optical construction of item 31, wherein the plurality of substantially randomly arranged microlenses comprises a plurality of substantially randomly arranged particles partially embedded in a first layer.

Item 33 is a projection system comprising:

an image projecting light source projecting an image light generally along a first direction onto an image plane, the first direction making an angle $\theta_1$ with a horizontal direction;

an ambient light source emitting ambient light generally along a second direction that makes an angle $\theta_2$ with the horizontal direction;

a symmetric optical diffuser placed in the image plane and having a first viewing angle $A_H$ along the horizontal direction and a second viewing angle $A_V$ along a vertical direction orthogonal to the horizontal direction, $A_H$ being substantially equal to $A_V$, $A_V/2$ being greater than $\theta_1$ and smaller than $\theta_2$; and a substantially specular reflector reflecting light that is not scattered by the symmetric optical diffuser and having a first average reflectance $R_1$ in the visible at an incident angle of about $\theta_1$ and a second average reflectance $R_2$ in the visible at an incident angle of about $\theta_2$, $R_1/R_2$ being at least about 1.5.

As used herein, terms such as "vertical", "horizontal", "above", "below", "left", "right", "upper" and "lower", "front" and "back", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the construction in FIG. 1 is rotated by 90 degrees as compared to the orientation in the figure, arrow direction 130 is still considered to be along the "horizontal" direction.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A light diffusing optical construction comprising:

a symmetric optical diffuser scattering light in a first direction with a first viewing angle $A_H$ and in a second direction orthogonal to the first direction with a second viewing angle $A_V$ substantially equal to $A_H$, the symmetric optical diffuser comprising:
a substantially optically transparent first layer; and
a plurality of substantially randomly arranged optically transparent beads partially embedded in the first layer;

a substantially specular reflector reflecting light that is not scattered by the symmetric optical diffuser and having a first average reflectance $R_o$ in the visible at a substantially zero incident angle and a second average reflectance $R_{60}$ in the visible at a substantially 60 degree incident angle, $R_o/R_{60}$ being at least 1.5; and a light absorbing layer absorbing light that is not reflected by the specular reflector.

2. The light diffusing optical construction of claim 1, wherein $A_H/A_V$ is not greater than 1.2.

3. The light diffusing optical construction of claim 1, wherein $A_H/A_V$ is not greater than 1.1.

4. The light diffusing optical construction of claim 1, wherein an average optical transmission of the first layer is not less than 70%.

5. The light diffusing optical construction of claim 1, wherein an average optical transmission of the first layer is not less than 80%.

6. The light diffusing optical construction of claim 1, wherein an average optical transmission of the beads is not less than 70%.

7. The light diffusing optical construction of claim 1, wherein an average optical transmission of the beads is not less than 80%.

8. The light diffusing optical construction of claim 1, wherein the beads are substantially spherical.

9. The light diffusing optical construction of claim 1, wherein the beads have an index of refraction that is in a range from 1.3 to 3.2.

10. The light diffusing optical construction of claim 1, wherein the beads have an index of refraction that is in a range from 1.4 to 2.5.

11. The light diffusing optical construction of claim 1, wherein the beads have an index of refraction that is in a range from 1.4 to 2.

12. The light diffusing optical construction of claim 1, wherein a difference between an index of refraction of the beads and an index of refraction of the first layer is not greater than 0.05.

13. The light diffusing optical construction of claim 1, wherein a difference between an index of refraction of the beads and an index of refraction of the first layer is not greater than 0.03.

14. The light diffusing optical construction of claim 1, wherein a difference between an index of refraction of the beads and an index of refraction of the first layer is not greater than 0.02.

15. The light diffusing optical construction of claim 1, wherein the symmetric optical diffuser is substantially polarization-insensitive.

16. The light diffusing optical construction of claim 15, wherein gain curves of the symmetric optical diffuser for two mutually orthogonal polarized incident lights differ by no more than 10%.

17. The light diffusing optical construction of claim 15, wherein gain curves of the symmetric optical diffuser for two mutually orthogonal polarized incident lights differ by no more than 5%.

18. The light diffusing optical construction of claim 1, wherein a ratio of a specular reflectance to a total reflectance of the substantially specular reflector at a visible wavelength is not less than 0.7.

19. The light diffusing optical construction of claim 1, wherein a ratio of a specular reflectance to a total reflectance of the substantially specular reflector at a visible wavelength is not less than 0.8.

20. The light diffusing optical construction of claim 1, wherein a ratio of a specular reflectance to a total reflectance of the substantially specular reflector at a visible wavelength is not less than 0.9.

21. The light diffusing optical construction of claim 1, wherein $R_o/R_{60}$ is at least 1.7.

22. The light diffusing optical construction of claim 1, wherein $R_o/R_{60}$ is at least 2.

23. The light diffusing optical construction of claim 1, wherein the substantially specular reflector comprises a substantially flat reflectance spectrum in the visible.

24. The light diffusing optical construction of claim 23, wherein a ratio of a reflectance at a blue wavelength and a reflectance at a red wavelength of the substantially specular reflector is in a range from 0.8 to 1.2.

25. The light diffusing optical construction of claim 23, wherein a ratio of a reflectance at a blue wavelength and a reflectance at a red wavelength of the substantially specular reflector is in a range from 0.9 to 1.1.

26. A front projection screen comprising the light diffusing optical construction of claim 1.

27. A projection system comprising:
one or more image forming devices projecting an image onto a display plane; and the light diffusing optical construction of claim 1 positioned in the display plane.

28. The projection system of claim 27, wherein an output light of the one or more image forming devices is substantially unpolarized.

29. The projection system of claim 27, wherein the one or more image forming devices comprises a digital micro-mirror array.

30. The projection system of claim 27, wherein the one or more image forming devices comprises a liquid crystal array.

31. A light diffusing optical construction comprising:
a symmetric optical diffuser comprising a plurality of substantially randomly arranged microlenses and scattering light in a first direction with a first viewing angle $A_H$ and in a second direction orthogonal to the first direction with a second viewing angle $A_V$ substantially equal to $A_H$;
a substantially specular reflector reflecting light that is not scattered by the symmetric optical diffuser and having a first average reflectance $R_o$ in the visible at a substantially zero incident angle and a second average reflectance $R_{60}$ in the visible at a substantially 60 degree incident angle, $R_o/R_{60}$ being at least 1.5; and
a light absorbing layer absorbing light that is not reflected by the specular reflector.

32. The light diffusing optical construction of claim 31, wherein the plurality of substantially randomly arranged microlenses comprises a plurality of substantially randomly arranged particles partially embedded in a first layer.

33. A projection system comprising:
an image projecting light source projecting an image light generally along a first direction onto an image plane, the first direction making an angle $\theta_1$ with a horizontal direction;
an ambient light source emitting ambient light generally along a second direction that makes an angle $\theta_2$ with the horizontal direction;
a symmetric optical diffuser placed in the image plane and having a first viewing angle $A_H$ along the horizontal direction and a second viewing angle $A_V$ along a vertical direction orthogonal to the horizontal direction, $A_H$ being substantially equal to $A_V$, $A_{V/2}$ being greater than $\theta_1$ and smaller than $\theta_2$; and
a substantially specular reflector reflecting light that is not scattered by the symmetric optical diffuser and having a first average reflectance $R_1$ in the visible at an incident angle of about $\theta_1$ and a second average reflectance $R_2$ in the visible at an incident angle of about $\theta_2$, $R_1/R_2$ being at least 1.5.

* * * * *